This invention relates to dynamo-electric machines having permanent magnet excitation, and to synchronous motors of this general type.

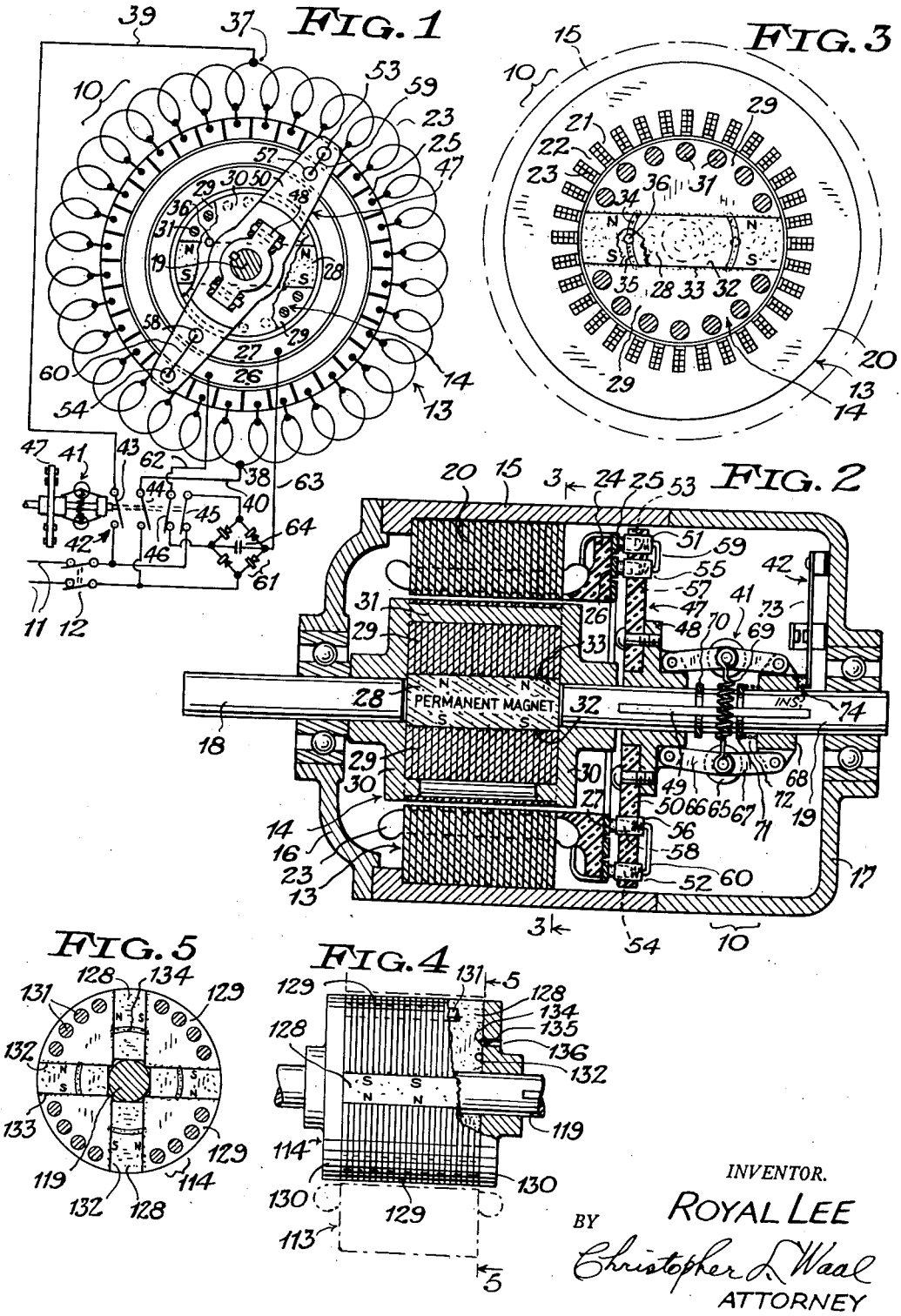
Dec. 19, 1961 R. LEE 3,014,142
SYNCHRONOUS DYNAMO-ELECTRIC MACHINES
Filed Feb. 6, 1958
INVENTOR.
ROYAL LEE
BY Christopher L. Waal
ATTORNEY 3,014,142
SYNCHRONOUS DYNAMO-ELECTRIC MACHINES
Royal Lee, Box 267, Elm Grove, Wis.
Filed Feb. 6, 1958, Ser. No. 713,650
11 Claims. (Cl. 310—162)

An object of the invention is to provide a dynamo-electric machine, and particularly a synchronous motor, in which permanent magnet excitation is applied in an improved and efficient manner to one of the relatively rotatable members of the machine.

Another object is to provide a dynamo-electric machine of this character which will minimize short-circuiting of the permanent magnet flux, and in which the permanent magnet will resist demagnetization.

Still another object is to provide one of the relatively rotatable members of the machine, and particularly the rotor thereof, with a frame which will facilitate the mounting of the permanent magnet and associated parts.

A further object is to provide a synchronous motor having improved starting means affording ample starting torque.

The invention further consists in the several features hereinafter described and claimed.

In the accompanying drawing, illustrating certain embodiments of the invention,

FIG. 1 is a schematic diagram of a synchronous motor embodying the invention, parts being broken away and parts being shown in section;

FIG. 2 is a longitudinal vertical sectional view of the motor as it appears when at rest;

FIG. 3 is a transverse sectional view taken generally on the line 3—3 of FIG. 2;

FIG. 4 is a fragmentary side elevation of a modified form of rotor, parts being broken away and parts being shown in section, and FIG. 5 is a transverse sectional view taken generally on the line 5—5 of FIG. 4.

Referring to FIG. 1 of the drawing, there is illustrated a two-pole, single-phase, self-starting synchronous motor 10 supplied with power from single-phase alternating current line conductors 11, here shown to include a line switch 12. The motor comprises a wound stator member 13 and a cooperating permanent magnet rotor member 14, the stator member being mounted in a housing 15, FIG. 2, including end bells 16 and 17, and the rotor member having a two-part shaft 18, 19, journalled in the end bells. The stator member includes a magnetizable laminated annular core 20 surrounding the rotor and provided with a series of interior axially extending slots 21 and intervening equally spaced pole-forming teeth 22. A closed armature-type winding 23 is placed in the slots and is rigidly held therein, as by insulating varnish. A ring 24 of insulating material, FIG. 2, is rigidly secured to one end of the stator member, as by bonding it by the insulating varnish to the end turns of the stator winding 23, and carries a flat commutator 25 and two flat slip rings 26 and 27 all arranged in coplanar concentric relation. The inner diameter of the insulating ring 24 is preferably larger than the rotor diameter. The commutator segments are connected to the closed armature-type stator winding 23 and are preferably disposed outside of the slip rings. The commutator and slip rings are provided for starting purposes, as hereinafter described.

The rotor member 14 comprises a flat, generally rectangular block or plate 28 of permanent magnet material extending in an axial plane and flanked at opposite sides by a pair of segmental laminated core sections 29 forming pole pieces of opposite polarity, the cylindrical assembly thus formed being rigidly secured together by hubbed metal end disks 30, such as of aluminum alloy, connected by parallel conductor bars 31 which extend through the core sections at or near the periphery of the rotor and hold these core sections in position. The end disks and connected conductor bars form a rotor frame. The conductor bars are preferably cast integral with the end disks, although in some instances they may be made of copper and brazed or welded to the end disks. These conductor bars form with the end disks a damper winding to prevent hunting of the motor. The space between the flat inner faces of the core sections 29 forms a parallel-sided open-ended diametral slot 32 which subsequently receives the permanent magnet 28. The magnet is introduced into the slot in which it closely fits, and is rigidly secured therein, as by iron cement 33 which fills the joints or interstices between the magnet, the core sections, and the end disks, the cement containing finely divided iron. The magnet and end disks are here shown to have registering cement-receiving grooves 34 and 35 to facilitate anchoring of the magnet, the end disks having cement-injecting openings 36 communicating with the grooves.

The permanent magnet 28 comprises a block of ceramic material in the nature of a highly oriented barium ferrite, one commercial form of which is known as "Indox V." The block is strongly magnetized in a transverse direction, or parallel to its thickness, so that one face of the magnet is a north pole and the opposite face is a south pole, these faces lying in parallel planes extending on opposite sides of the rotor axis. This permanent magnet material has the desirable property of strongly resisting demagnetization by an alternating magnetic field. The soft iron pole pieces 29 of the rotor do not cover the outer edges of the magnet block, thus avoiding short-circuiting of the permanent magnet flux. With the two-pole rotor in place in the stator the rotor flux passes mainly through the stator core. The magnet block extends over the full diameter of the rotor, thus providing a relatively large magnetic flux through the rotor pole pieces. The inner ends of the rotor shaft sections 18, 19 are rigidly anchored in the hub portions of the respective rotor end disks 30. The shaft sections are desirably formed of a non-magnetic metal such as a strong aluminum alloy, and in some instances may be integral with the ends disks. However, steel may be used if the inner ends of the shaft sections are spaced a sufficient distance from the permanent magnet block.

Each rotor core section 29 presents a cylindrically curved pole face which extends through a relatively wide arc, for example about 150°, in the case of the two-pole motor shown. Each pole face is, in effect, extended to 180° to the median plane of the permanent magnet, although the permanent magnet flux decreases to zero at the center of the rounded ends of the magnet.

The closed armature-type stator winding 23 is provided with diametrically opposite taps 37 and 38, FIG. 1, which are connected to the alternating current line 11 by respective switch-controlled conductors 39 and 40 when the motor is in normal operation. A speed-responsive device 41, hereinafter more fully described, is driven by the rotor and actuates a switch assembly 42 carried by the motor end bell 17, FIG. 2. The switch assembly includes a pair of normally open switch sections 43 and 44 and a pair of normally closed switch sections 45 and 46, as shown in FIG. 1. The switch sections 43 and 44 control alternating current energization of the stator winding through the conductors 39 and 40, while the switch sections 45 and 46 control a starting circuit hereinafter described. When the motor is brought up to approximately synchronous speed in either direction, as hereinafter described, the switch sections 43 and 44 close and the switch sections 45 and 46 open. The closing of the switch sections 43 and 44 results in alternating current energization of the tapped stator winding, and the motor locks in and rotates at synchronous speed, the rotor requiring no electrical connections. The two-pole motor illustrated will run at a synchronous speed of 3600 r.p.m. when energized from a 60-cycle source. As above noted, the rotor conductor bars 31 and connected end disks 30 form a damper winding for preventing hunting of the motor.

For starting the motor, electrical connections are established whereby the motor runs during the starting period with direct-current excitation of the commutated stator winding 23, thus providing ample starting torque. A rotatable and axially shiftable brush carrier 47 includes a hub member 48 which is drivingly connected to the shaft section 19, as by a spline key 49, and further includes a diametrically extending arm 50, such as of insulating material, which is rigidly secured to the hub member. The arm 50 carries a pair of diametrically opposite brush holders 51 and 52 provided with respective spring-pressed brushes 53 and 54 adapted to bear on the stationary commutator, and a pair of brush holders 55 and 56 with respective spring-pressed brushes 57 and 58 adapted to bear on the respective stationary slip rings 26 and 27. The brushes 53 and 57 are electrically connected by a conductor 59, and the brushes 54 and 58 are electrically connected by a conductor 60. A rectifier 61 of the full-wave bridge dry-contact type, such as the silicon variety, has its input terminals connected to the line conductors 11 and has its output terminals connected by conductors 62 and 63 to the stationary slip rings 26 and 27. The switch section 45 is placed in one of the input leads of the rectifier, and the switch section 46 is placed in the rectifier output conductor 62. If desired, a filter capacitor 64 may be connected across the output terminals of the rectifier. Rectified current is fed to the stator winding by way of the stationary commutator and slip rings and the rotating brushes to accelerate the permanent magnet rotor to approximately synchronous speed. The direction of rotor rotation may be reversed by interchanging the connections of the conductors 62 and 63 to the output terminals of the rectifier.

For synchronous operation of the motor provision is made to interrupt the direct-current excitation of the commutated stator winding and to connect the opposite taps 37 and 38 of the stator winding to the line by way of the conductors 39 and 40. This changeover is effected by the speed-responsive device 41, which is preferably of a snap-action centrifugal type, and which also serves as a brush-lifting mechanism. The centrifugal device includes flyweights 65 on opposite sides of the shaft 19 connected by links 66 to the brush carrier hub member 45 and by links 67 to a collar 68 axially spaced from the brush carrier hub member and splined to the shaft, the weights being urged inwardly by coiled tension springs 69. The axial movement of the brush carrier away from the commutator is limited by a stop-forming snap ring 70 on the shaft, and axial movement of the collar 68 toward the brush carrier is limited by a second stop-forming snap ring 71. If desired, a coiled spring 72 may be interposed between the collar 68 and the snap ring 71. The switch assembly 42, which is carried by the stator end bell 17, includes a spring arm 73 having an insulating button 74 on its free end bearing against the outer end face of the slidable collar 68. In some instances, one of the switch sections 43 and 44 may be omitted. Also, in some instances, one or both of the switch sections 45 and 46 may be omitted, the starting circuit then being interrupted by the brush-lifting action.

In operation, the motor is started by closing the line switch 12, thus supplying alternating current to the rectifier 61 which in turn supplies unidirectional current to the commutated stator winding. This energizing circuit extends from one output terminal of the rectifier, through the conductor 62 and its then closed switch section 46, the outer stationary slip ring 26, the rotatable slip ring brush 57, the conductor 59, the rotatable commutator brush 53, the stationary commutator 25, the stator winding 23, the second rotatable commutator brush 54, the conductor 60, the rotatable slip ring brush 58, the inner stationary slip ring 27, and the conductor 63 back to the other output terminal of the rectifier. The field-forming permanent magnet rotor member then reacts with the energized stator member to provide a starting torque which accelerates the rotor member to approximately synchronous speed. The centrifugal device 41 thereupon axially shifts the rotating brush carrier 47 to its brush-lifting position for breaking the circuit through the stationary commutator, and actuates the switch assembly 42 to close the switch sections 43 and 44 for supplying alternating current to the oppositely tapped stator winding, and to open the switch sections 45 and 46 in the starting circuit. However, the starting circuit is also interrupted at the lifted brushes. The motor thereupon operates as a synchronous motor, and the damper winding on the rotor member prevents hunting of the motor. The retracted brush carrier rotates with the shaft section 19, and the lifted brushes are not subject to wear.

The modified form of permanent magnet rotor member 114 shown in FIGS. 4 and 5 is of the four-pole type and includes four laminated core sections 129 of generally sectoral shape forming pole pieces and forming four equally spaced parallel-sided radial slots 132 between them, one pair of aligned slots being at right angles to the other pair of aligned slots. The four core sections form a cylindrical assembly which is rigidly secured together by hubbed metal end disks 130 similar to the end disks 30 of FIG. 2 and connected by parallel conductor bars 131 similar to the conductor bars 31 of FIG. 2, the end disks and bars forming a rotor frame and a damper winding. A non-magnetic shaft 119, such as of aluminum alloy, passes through and is rigidly secured to both end disks. In some instances, the shaft may be of steel with a sleeve of aluminum or other non-magnetic metal, not shown. The rotor slots 132 have rigidly secured therein, as by means of iron cement 133, respective block-like permanent magnets 128 similar to the magnet 28 of FIG. 2, except that their inner ends are adjacent to the shaft 119. The magnet and end disks are here shown to have registering cement-receiving grooves 134 and 135 to facilitate anchoring of the magnet, the end disks having cement-injecting openings 136 communicating with the grooves. Each magnet block is transversely magnetized, as indicated in FIG. 5, and the successive rotor core sections 129 are of opposite polarity. The rotor member of FIGS. 4 and 5 is placed in a suitably wound stator member 113 similar to that of FIGS. 1 to 3.

In some cases the two-pole rotor member of FIG. 2 may be provided with a through shaft like that of the rotor member of FIG. 4, in which event the permanent magnet of the rotor member will be formed of a pair of aligned sections instead of a single block.

Certain features of the invention may also be embodied in a synchronous motor of inverted construction in which the stator member forms the permanent magnet field and the rotor member carries an energizing winding, the stator member being provided with a magnet-mounting core-holding frame which forms a damper winding and which is radially slotted to receive the permanent magnets.

The permanent magnet field member of the synchronous motor may also be used with a cooperating motor member energized from a polyphase supply.

I claim:

1. A field structure for a dynamo-electric machine, comprising spaced magnetizable core members forming arcuate pole faces of a polar area, said core members having spaced confronting parallel faces forming a radially extending parallel-sided slot between them opening radially of the field structure, and a permanent magnet insertible radially into and secured in said slot and having opposite parallel faces adjacent to the confronting faces of said core members, said permanent magnet being polarized transversely of its opposite faces for exciting said core members to opposite polarity, and said magnet having an end disposed substantially at the open end of said slot adjacent to the polar area.

2. A field structure for a dynamo-electric machine, comprising a damper-forming frame including electrically conductive end plates and conductor bars connecting said end plates, spaced magnetizable core members confined between said end plates and presenting arcuate pole faces of a polar area, said bars extending through said core members adjacent to said pole faces and securing said core members in assembled relation, said core members having spaced confronting parallel faces forming a slot-like space between them extending in a direction radially of the frame and opening radially of the frame, and a permanent magnet insertible radially into and secured in said space and having opposite parallel faces adjacent to the confronting faces of said core members, said permanent magnet being polarized transversely of its opposite faces for exciting said core members to opposite polarity, and said magnet extending substantially to the open end of said slot-like space adjacent to said polar area.

3. A rotor for a dynamo-electric machine, comprising spaced magnetizable core members having spaced confronting parallel faces forming a radially extending magnet-admitting slot between them opening at the periphery of the rotor, said core members further having respective pole faces at the periphery of the rotor, a permanent magnet secured in said slot and having opposite parallel faces adjacent to the confronting faces of said core members, said permanent magnet being polarized transversely of its opposite faces for exciting said core members to opposite polarity, and said magnet extending substantially to the periphery of the rotor.

4. A rotor for a dynamo-electric machine, comprising a pair of spaced magnetizable core members of segmental shape forming a magnet-admitting slot between them extending diametrically of the rotor and open at opposite ends at the periphery of the rotor, said slot having parallel walls disposed at opposite sides of the rotor axis and lying parallel to said axis, said core members having arcuate pole faces along the periphery of the rotor, a permanent magnet secured in said slot and having its opposite ends adjacent to the periphery of the rotor, said magnet having opposite parallel faces adjacent to the parallel walls of said slot, said permanent magnet being polarized transversely of its opposite faces for exciting said core members to opposite polarity, and the opposite ends of said magnet extending substantially to diametrically opposite points of the periphery of said rotor.

5. A field structure for a dynamo-electric machine, comprising magnetizable core members having arcuate pole faces and further having confronting parallel faces forming a radially extending slot between them, and a permanent magnet of oriented barium ferrite insertible radially into and secured in said slot and having opposite faces adjacent to said respective core members, said permanent magnet being polarized transversely of its opposite faces for exciting said core members to opposite polarity.

6. A field structure for a dynamo-electric machine, comprising spaced magnetizable core members presenting arcuate pole faces of a polar area, the adjacent pairs of core members having spaced confronting parallel faces forming radially extending parallel-sided slots between them opening radially of the field structure, the latter faces of each core member being inwardly convergent, and permanent magnets insertible radially into and secured in said slots and each having opposite parallel faces adjacent to the confronting faces of the adjacent core members, each permanent magnet being polarized transversely of its opposite faces for exciting the adjacent core members to opposite polarity.

7. A rotor for a dynamo-electric machine, comprising angularly spaced magnetizable core members having respective arcuate pole faces at the periphery of the rotor, each adjacent pair of core members having spaced confronting faces within the rotor, the latter faces of each core member being inwardly convergent, and permanent magnets secured in the rotor between the adjacent pairs of core members and each having opposite faces within the rotor adjacent to the confronting faces of the adjacent core members, each pair of confronting faces forming a parallel-sided, radially open slot into which the associated permanent magnet is radially insertible, said magnet extending substantially to the outer end of said slot, each permanent magnet being polarized transversely of its opposite faces for exciting the adjacent core members to opposite polarity.

8. A rotor for a dynamo-electric machine, comprising spaced magnetizable core members having respective arcuate pole faces at the periphery of the rotor, said core members being spaced to form a diametrically extending parallel-sided slot between them opening at the periphery of the rotor, electrically conductive end disks between which the core members are confined, conductor bars connecting said end disks and extending through the peripheral portions of said core members to position said spaced core members, said end disks forming the opposite edge faces of said slot, a permanent magnet secured diametrically in said slot in intersecting relation to the rotor axis and having opposite parallel faces adjacent to said core members, said permanent magnet being polarized transversely of its opposite faces for exciting said core members to opposite polarity, the opposite ends of said magnet being disposed substantially at the periphery of the rotor, and aligned shaft members secured to said end disks.

9. A field structure for a dynamo-electric machine, comprising a frame including electrically conductive end plates and conductor bars connecting said end plates, spaced magnetizable core members confined between said end plates and presenting pole faces, said bars extending through said core members adjacent to said pole faces and securing said core members in assembled relation, said core members having spaced confronting parallel faces forming a cavity between them extending in a direction radially of the frame and opening radially of the frame, said end plates forming opposite parallel side walls of said cavity, and a permanent magnet insertible radially into and secured in said cavity and having opposite parallel faces adjacent to the confronting faces of said core members and further having opposite parallel edge faces adjacent to the side walls of said cavity, said permanent magnet being polarized transversely of its opposite faces for exciting said core members to opposite polarity.

10. A synchronous electric motor, comprising cooperating stator and rotor members, said rotor member being a field member with permanent magnet excitation, said stator member having an armature winding and a stationary commutator connected to said winding, means including a brush carrier rotatable with the rotor member and having brushes bearing on said commutator for supplying unidirectional current to said commutator to start the motor to approximately synchronous speed, means for supplying alternating current to said stator winding for synchronous operation of the motor, and speed-responsive means for lifting said brushes from the commutator after the starting operation and for controlling the supply of alternating current to said stator winding.

11. A synchronous electric motor, comprising cooperating stator and rotor members, said rotor member being a field member with permanent magnet excitation, said stator member having an armature winding and a stationary commutator connected to said winding, and said stator member further having a pair of slip rings, an axially shiftable brush carrier rotatable with the rotor member and having brushes bearing on said commutator and other brushes bearing on said slip rings, said commutator brushes being connected to the respective slip ring brushes, means for supplying unidirectional current to said commutator through said slip rings and brushes to start the motor to approximately synchronous speed, speed-responsive means for axially shifting said brush carrier to lift the brushes from the commutator and slip rings after the starting operation, and means controlled by said speed-responsive means for supplying alternating current to said stator winding for synchronous operation of the motor.

References Cited in the file of this patent

UNITED STATES PATENTS

| | | |
|---|---|---|
| 1,022,904 | Webster | Apr. 9, 1912 |
| 1,227,815 | Meyer | May 29, 1917 |
| 1,275,292 | Neuland | Aug. 13, 1918 |
| 1,545,422 | Graichen | July 7, 1925 |
| 1,631,102 | Leake | May 31, 1927 |
| 1,798,571 | Walther | Mar. 31, 1931 |
| 2,519,895 | Edwards et al. | Aug. 22, 1950 |
| 2,525,456 | Merrill | Oct. 10, 1950 |
| 2,546,877 | Taltavull | Mar. 27, 1951 |
| 2,579,978 | Snoek et al. | Dec. 25, 1951 |
| 2,745,084 | Bundy | May 8, 1956 |
| 2,803,763 | Dunn | Aug. 20, 1957 |